US010054681B2

(12) United States Patent
Rowe et al.

(10) Patent No.: US 10,054,681 B2
(45) Date of Patent: Aug. 21, 2018

(54) MULTI FREQUENCY 2D PHASED ARRAY TRANSDUCER

(75) Inventors: Francis Dale Rowe, Poway, CA (US); John Romero, San Marcos, CA (US)

(73) Assignee: ROWE TECHNOLOGIES, INC., Poway, CA (US)

( * ) Notice: Subject to any disclaimer, the term of this patent is extended or adjusted under 35 U.S.C. 154(b) by 905 days.

(21) Appl. No.: 13/282,257

(22) Filed: Oct. 26, 2011

(65) Prior Publication Data

US 2012/0106299 A1 May 3, 2012

Related U.S. Application Data

(60) Provisional application No. 61/456,086, filed on Nov. 1, 2010.

(51) Int. Cl.
*G01S 15/00* (2006.01)
*G01S 15/89* (2006.01)
(Continued)

(52) U.S. Cl.
CPC ............ *G01S 15/89* (2013.01); *B06B 1/0622* (2013.01); *B06B 1/0625* (2013.01); *G01S 7/52003* (2013.01); *G01S 15/58* (2013.01); *G01S 15/60* (2013.01); *H04R 1/40* (2013.01); *H04R 2201/401* (2013.01); *H04R 2201/403* (2013.01)

(58) Field of Classification Search
USPC ................................... 367/90, 138
See application file for complete search history.

(56) References Cited

U.S. PATENT DOCUMENTS 5,077,700 A 12/1991 Shaw et al.
5,122,990 A 6/1992 Deines et al.
(Continued)

FOREIGN PATENT DOCUMENTS

CN 1117139 A 2/1996
WO WO 2010/111157 9/2010

OTHER PUBLICATIONS

Aydogdu E., et al., "Nonlinear Equivalent Circuit Model for Circular CMUTs in Uncollapsed and Collapsed Mode." 2012 IEEE International Ultrasonics Symposium, IEEE, 2012.
(Continued)

*Primary Examiner* — James R Hulka
(74) *Attorney, Agent, or Firm* — Gazdzinski & Associates, PC

(57) ABSTRACT

Improved two-dimensional planar array transducer and beamformer apparatus and methods. In one embodiment, the two-dimensional planar array transducer is capable of simultaneously or sequentially forming multiple acoustic beams in two axes and at two or more widely separated acoustic frequencies from a single flat planar array transducer. The transducer planar array consists of two or more electrically and acoustically independent two dimensional planar transducer array structures operating at different frequencies that are physically integrated onto a single multi frequency configuration. In an exemplary embodiment, a second higher frequency transducer array is positioned within the aperture area of a lower frequency planar array transducer. Methods of using the aforementioned two-dimensional planar array transducer and beamformer are also disclosed.

20 Claims, 4 Drawing Sheets

(51) Int. Cl.
  *G01S 7/52* (2006.01)
  *B06B 1/06* (2006.01)
  *G01S 15/58* (2006.01)
  *G01S 15/60* (2006.01)
  *H04R 1/40* (2006.01)

(56) References Cited

U.S. PATENT DOCUMENTS

| | | |
|---|---|---|
| 5,208,785 A | 5/1993 | Brumley et al. |
| 5,343,443 A | 8/1994 | Merewether |
| 5,615,173 A | 3/1997 | Brumley et al. |
| 5,617,865 A | 4/1997 | Palczewska et al. |
| 5,689,445 A | 11/1997 | Vogt et al. |
| 5,808,967 A | 9/1998 | Yu et al. |
| 5,923,617 A | 7/1999 | Thompson et al. |
| 6,052,334 A | 4/2000 | Brumley et al. |
| 6,097,671 A | 8/2000 | Merewether |
| 6,183,419 B1 | 2/2001 | Wildes |
| 6,282,151 B1 | 8/2001 | Brumley et al. |
| 6,647,804 B1 | 11/2003 | Deines |
| 6,678,210 B2 | 1/2004 | Rowe |
| 6,700,834 B2 | 3/2004 | Blair et al. |
| 6,714,482 B2 | 3/2004 | Rowe |
| 6,821,251 B2 | 11/2004 | Alexandru |
| 7,317,660 B2 | 1/2008 | Brumley et al. |
| 7,527,592 B2 | 5/2009 | Haugen |
| 7,542,374 B2 | 6/2009 | Brumley et al. |
| 7,847,925 B2 | 12/2010 | Vogt |
| RE43,090 E | 1/2012 | Rowe |
| 8,411,530 B2* | 4/2013 | Slocum et al. ............ 367/90 |
| 8,512,250 B2 | 8/2013 | Quistgaard |
| 2003/0076742 A1 | 4/2003 | Rowe |
| 2006/0155492 A1* | 7/2006 | Strong et al. ............ 702/76 |
| 2008/0080313 A1 | 4/2008 | Brumley et al. |
| 2008/0080314 A1* | 4/2008 | Brumley et al. ............ 367/89 |
| 2009/0052282 A1* | 2/2009 | Strong et al. ............ 367/89 |
| 2009/0182237 A1 | 7/2009 | Angelsen et al. |
| 2010/0142324 A1 | 6/2010 | Vogt |
| 2010/0157739 A1* | 6/2010 | Slocum et al. ............ 367/131 |
| 2010/0195443 A1* | 8/2010 | LaWhite ............ G01P 5/241 367/87 |
| 2011/0075518 A1* | 3/2011 | Huhta et al. ............ 367/90 |
| 2011/0189350 A1 | 8/2011 | Van Belleghem et al. |
| 2014/0230567 A1 | 8/2014 | Rowe et al. |

OTHER PUBLICATIONS

Bird, "Coherent Clutter Removal and Doppler Etimatiomn", Simon Frazer University, 2012.
Brumley, et al., "Performance of a Broad-Band Acoustic Doppler Current Profiler", IEEE Journal of Oceanic Engineering, vol. 16, No. 4, Oct. 1991, pp. 402-407.
Cabrera, et al., American Society of Civil Engineers, "Side Looking Doppler Velocity Sensors", Jul. 30-Aug. 2, 2000.
Doppler Solutions, Feb. 28, 2003.
Frazier, "A two-dimensional amplitude-steered array for real-time volumetric imaging," Doctoral Thesis, University of Illinois at Urbana-Champaign, pp. 170 (Apr. 2000).
Goss, et al., "An introduction to WSR-88C clutter suppression", NEXTRAD weather service.
Huddleston, et al., "Tools for Technicians; Lessons Learned in Index-Velocity Site Selection and ADVM Setup", May 2007.
IEEE Ultrasonics Symposium pp. 1231.
LeCoz, et al., "Evaluation of river discharges monitored by a fixed sidelooking Doppler Profiler", Jun. 2008.
Lee, et al., "Radar clutter suppression using adaptive algorithms"; Aerospace conference 2004, IEEE procedings, vol. 3.
Moore, et al., "Measuring river flow using side-looking Acoustic Doppler Current Profilers: a comparison to vertically-oriented ADCP results" (2009).
Morlock, S.E., 1994, Evaluation of acoustic Doppler current profiler measurements of river discharge: "U.S. Geological Survey Water-Resources Investigation Report 95-4218, 37".
Ruhl, C.A., and Simpson, M.R., 2005, "Computation of discharge using the index-veloci method in tidally affected areas", U.S. Geological Survey Scientific Investigations Report 2005-5004, 31
H.Hidayat, B. Vermeulen, M.G. Sassi, P. Torts, A. Hoitink, "Discharge estimating inn a backwater affected neandering river", Mar 2011.
URL:littp://hydroacoustics.usgsgov/indexvelocity/insirumentsshl cni, "Index-velocity and Other Fixed-deployment Instruments", Jan. 2013.
Vougioukas, et al., "Application note: River discharge monitoring using a vertically moving side-looking acoustic Doppler profiler".

* cited by examiner

US 10,054,681 B2

MULTI FREQUENCY 2D PHASED ARRAY TRANSDUCER

PRIORITY

This application claims priority to U.S. Provisional Patent Application Ser. No. 61/456,086 filed Nov. 1, 2010 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. FIELD OF THE INVENTION

The present invention relates generally to a planar array sonar transducer and in one exemplary aspect to a multi-frequency planar array sonar transducer for generating acoustic Doppler current profiles.

2. DESCRIPTION OF RELATED TECHNOLOGY

Sonar transducers are currently used in different types of acoustic backscatter systems that measure velocity and/or distance in two or three dimensions. One such sonar transducer is disclosed in U.S. Pat. No. 5,808,967 which discloses an acoustic planar array transducer that forms multiple beams at a single or relatively narrow range of frequencies along two axes of a single two-dimensional ("2D") phased array transducer. FIG. 1 illustrates such an acoustic array transducer 100. One pair of beams 110 is formed by connecting a beamformer to a first set of electrodes on one side of the transducer and the other pair 120 is formed by connecting a second beamformer to a second set of electrodes on the other side of the transducer. The electrodes on each side of the transducer are parallel thin lines of copper that are closely spaced and run across the entire dimension of the transducer in one direction. The electrodes on one side of the transducer run in the orthogonal direction relative to those on the other side of the transducer.

In order to simultaneously and independently form each pair of beams on both transmit and receive channels, two separate and independent transmit beamformers 130 and two separate and independent receive beamformers 140 are used. A transmit/receive switch (not shown) is also used to connect one transmit beamformer and one receive beamformer to the electrical contacts on one side of the transducer. A second and independent transmit and receive beamformer pair is connected through a second transmit/receive switch to the contacts on the second side of the transducer. The two transmit and receive beamformers are used to simultaneously generate two or more pairs of independent beams in each X and Y axis. One pair is inclined from broadside and orthogonal to the electrodes on one side of the transducer and the other pair is inclined from broadside and orthogonal to the electrodes on the other side of the transducer. Although these beams are in fixed locations, the fact that the beamformers are both simultaneous and independent allows for the possibility of concurrent and independent steering of one set of beams relative to the other. Furthermore, if the transducer electrodes are brought into the beamformers individually each beamformer could potentially generate a completely independent set of arbitrary simultaneous beams along each of the two orthogonal X and Y axes.

Alternate 2D planar array transducers are also used where the beam sets in each axis are not simultaneous, or independently formed. While these classes of 2D planar array sonars generally only require a single beamformer for transmit and/or receive thereby resulting in significantly less beamformer complexity, these types of alternate 2D planar array transducers have disadvantages such as having a fewer number of beams simultaneously formed and incomplete independence of the multiple 2D beams. In addition, the range of frequencies which these 2D planar array transducers and beamformers can generate acoustic beams is limited by the bandwidth achievable by the bandwidth of the transducer array itself. This is approximately fifty percent (50%), or a factor of 0.5, of a nominal operating frequency. Thus, the transducer is limited to about twenty-five percent (25%) above or twenty-five percent (25%) below a nominal operating frequency.

In many applications such as Acoustic Doppler Current Profiler (ADCP) applications, at least three (3) and usually four (4) inclined narrow beams 150 along two axes are required to measure three (3) dimensional currents in the water column. In ADCP applications from a surface vessel, it is desirable to measure current profiles throughout a given water column, however, the region of the water column near the surface is a more spatially and velocity dynamic (characterized by small scale variations in water velocity and scattering particles in the water) than the deeper water column. Accordingly, it is desirable to measure the shallower, near transducer region with a higher spatial, temporal and velocity resolution than the longer range region. For this class of 2D sonar applications, with the near dynamic and deeper less dynamic water motion, this can be best achieved by operating with two sonars separated in frequency by an approximate factor of four (4). Operation at the lower frequency provides greater sonar range (for use at deeper water column depths), but has less spatial, velocity, and temporal resolution. Conversely, operation at a higher frequency has less range, but provides better range, velocity and temporal resolution over the range (i.e. depth) which it can reach.

Currently, when using 2D planar array transducers for applications such as current profiling, this dual sonar frequency operation is achieved by using two physically separate and independent 2D planar array transducers. A face view of these two 2D planar array transducers 200 operating at frequencies separated by a factor of four (4) is illustrated in FIG. 2. For equivalent beamwidths from both arrays, the high frequency transducer 202 has a diameter that is a factor of four (4) smaller than the low frequency transducer 204 as the acoustic wavelength in water is a factor of four (4) smaller. Each circular transducer is eight (8) half (½) wavelength's wide on each side of it's its centerline. This two-transducer sonar provides the desired performance of high resolution over short range and long ranger lower resolution; however such a configuration is undesirable in that each transducer must be separately installed onto the vessel hull at locations where both transducer faces are exposed to the water. Accordingly, when installed in a vessel hull, this two transducer approach requires two hull penetrations, which can: (1) be expensive to install; and (2) be difficult to locate in the hull.

Accordingly, there is still a salient need for transducer arrays that can provide varying levels of spatial, velocity, and temporal resolution while being embodied within a single discrete form factor. Ideally such a solution will achieve such a desired form factor while providing comparable performance with multiple discrete transducer designs.

SUMMARY OF THE INVENTION

The present invention addresses the foregoing needs by providing improved transducer apparatus and methods of use.

In a first aspect of the invention, a transducer array is disclosed. In one embodiment, the transducer array includes two distinctly sized transducer arrays that correlate with two different operating frequencies, respectively, that are embodied within a single unitary planar array structure.

In one variant, the first transducer array includes a central portion that does not contain any of transducer elements for that first transducer array.

In another variant, the second transducer array is positioned within this central portion.

In yet another variant, the first transducer array occupies a first symmetrical area portion of the single flat planar surface while the second transducer array occupies a second symmetrical area portion of the single flat planar surface.

In yet another variant, the second symmetrical area portion is disposed entirely within the first symmetrical area portion.

In yet another variant, the second symmetrical area portion is substantially concentric with the first symmetrical area portion.

In yet another variant, the second symmetrical area portion occupies less than ten percent of the first symmetrical area portion.

In yet another variant, the first plurality of transducer elements is made up of an array having a row of a value M transducer elements and a column of a value N transducer elements.

In yet another variant, the second array of transducer elements is made up of an array having a row of a value X transducer elements and a column of having a value Y of transducer elements.

In one variant, the value M is equal to the value X and the value N is equal to the value Y.

In yet another variant, the value M is equal to the value N.

In a second aspect of the invention, a multi-frequency transducer array for use in an acoustic Doppler current profiler (ADCP) application is disclosed. In one embodiment, the multi-frequency transducer array includes a single transducer array structure having a first transducer array optimized for operation at a first depth and a second transducer array optimized for operation at a second depth different than the first depth.

In one variant, the first depth is expected to have a more spatially and velocity dynamic current than the second depth.

In an alternative variant, the first and second transducer array optimization comprises the configuration of an operating frequency for the first and second transducer arrays, respectively.

In yet another variant, the first transducer array comprises a fully filled array structure while the second transducer array comprises a partially filled array structure.

In yet another variant, the first transducer array is configured to operate at a first nominal operating frequency while the second transducer array is configured to operate at a second nominal operating frequency different than the first nominal operating frequency.

In yet another variant, the difference between the first and second nominal operating frequencies is greater than or equal to a factor of four.

In a third aspect of the invention, a transducer array is disclosed. In one embodiment, the transducer array includes a singular planar structure comprising at least two electrically and acoustically independent two dimensional planar transducers.

In one variant, the singular planar structure is configured to simultaneously or sequentially form multiple acoustic beams at two or more separated acoustic frequencies.

In yet another variant, the singular planar structure is further configured to simultaneously or sequentially form multiple acoustic beams along two axes.

In a fourth aspect of the invention, a marine vessel that includes any of the aforementioned transducer arrays is disclosed. In one embodiment, the marine vessel includes a surface ship. In another embodiment, the marine vessel includes a submersible vessel. In yet another embodiment, the marine vessel includes a stationary buoy.

In a fifth aspect of the invention, methods of using any of the aforementioned transducer arrays are disclosed.

These and other aspects of the invention shall become apparent when considered in light of the disclosure provided herein.

BRIEF DESCRIPTION OF THE DRAWINGS

The features, objectives, and advantages of the invention will become more apparent from the detailed description set forth below when taken in conjunction with the drawings, wherein.

All Figures disclosed herein are © Copyright 2010-2011 Rowe Technologies, Inc. All rights reserved.

DETAILED DESCRIPTION OF THE PREFERRED EMBODIMENT

Reference is now made to the drawings wherein like numerals refer to like parts throughout.

Overview

The present invention provides, inter cilia, an improved two-dimensional (2D) planar array transducer and beamformer which is capable of simultaneously or sequentially forming multiple acoustic beams in two axes and at two or more widely separated acoustic frequencies from a single flat planar array transducer. The transducer planar array consists of two or more electrically and acoustically independent two dimensional planar transducers operating at different frequencies and physically integrated into a single multi frequency configuration within the aperture area of a single planar array transducer.

DETAILED DESCRIPTION OF EXEMPLARY EMBODIMENTS

Detailed descriptions of the various embodiments and variants of the apparatus and methods of the invention are now provided. While primarily discussed in the context of Acoustic Doppler Current Profiler (ADCP) applications, the various apparatus and methodologies discussed herein are not so limited. In fact, many of the apparatus and methodologies described herein are useful in any planar array transducer where significant operating frequency is advantageous, and where overall multiple transducer apertures are also important. For example, many imaging and bathymetry sonars employ 1D or 2D planar arrays, and use two (2) physically separate sets of these arrays to achieve high resolution at shorter ranges, and lower resolution at longer ranges. In addition, many modern ocean going vessels employ such physically separate multiple sonars for this purpose. The same techniques described herein with respect to 2D ADCP sonar applications may equally be applied to these applications.

Furthermore, while primarily discussed in the context of a dual frequency two dimensional (2D) planar transducer having two distinct transducer arrays, it is appreciated that additional transducer arrays (i.e. three (3) or more) could be embodied within a 2D planar transducer in accordance with embodiments of the present invention as described subsequently herein. In addition, certain features discussed with respect to specific embodiments can, in many instances, be readily adapted for use in one or more other contemplated embodiments that are described herein. It can be readily recognized by one of ordinary skill, given the present disclosure that many of the features described herein possess broader usefulness outside of the specific examples and implementations with which they are described.

Multiple Frequency 2D Planar Array Transducers—

Figure 1:
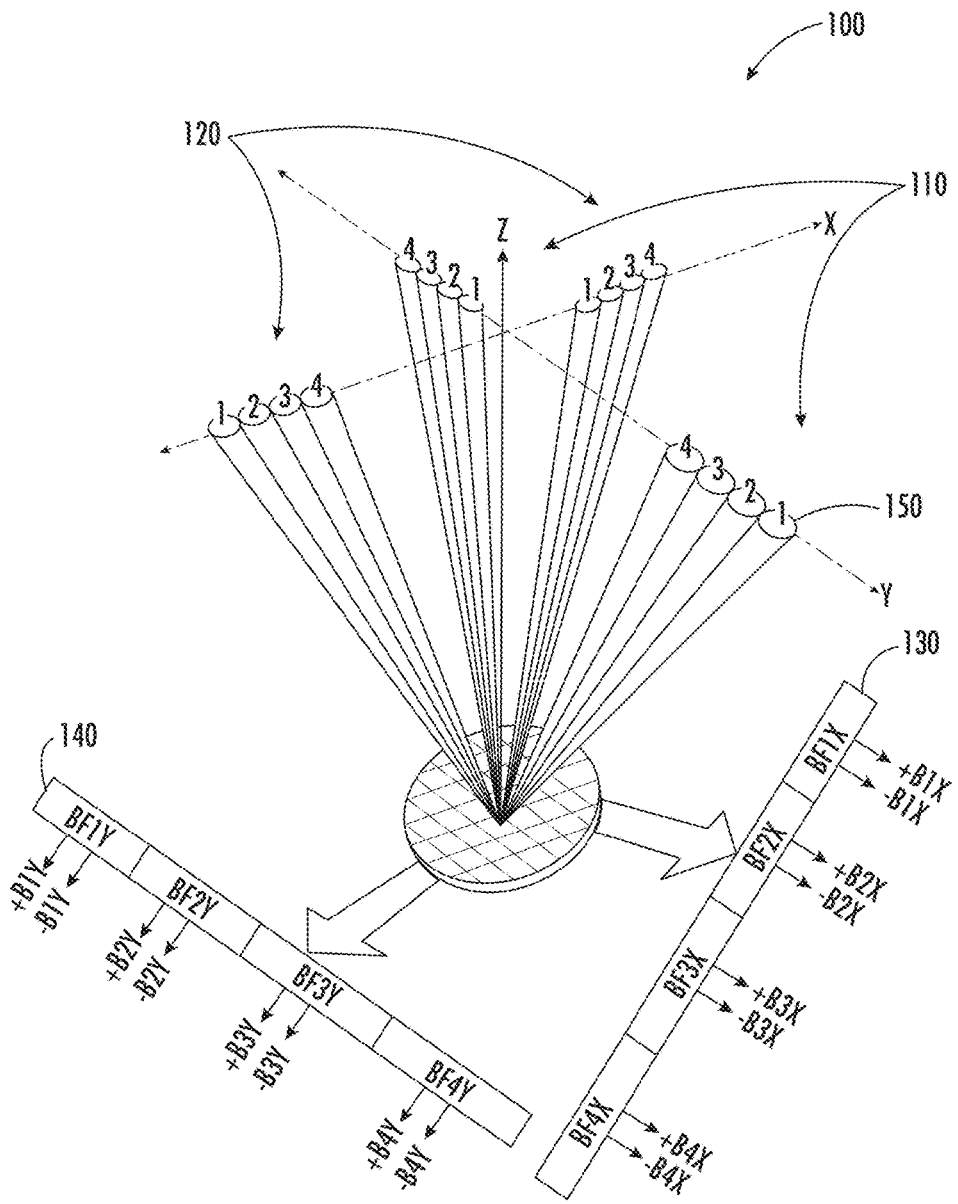
FIG. 1 is a functional block diagram of a prior art two-dimensional transducer array.
Figure 2:
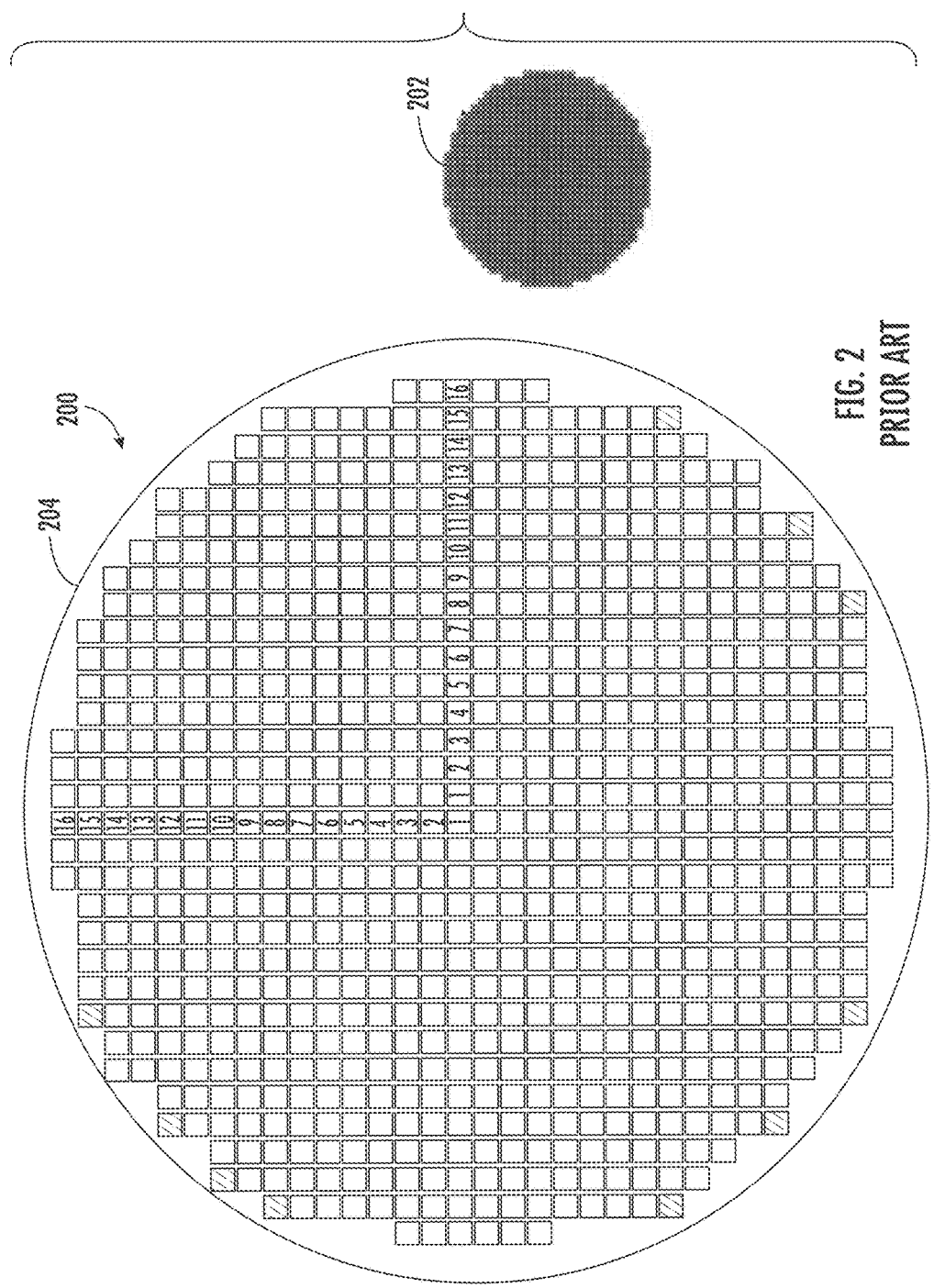
FIG. 2 illustrates a face view of two (2) prior art two-dimensional thirty-two by thirty-two half wavelength spaced planar array transducer elements with the larger transducer operating at a factor of four lower acoustic frequency.
Figure 3:
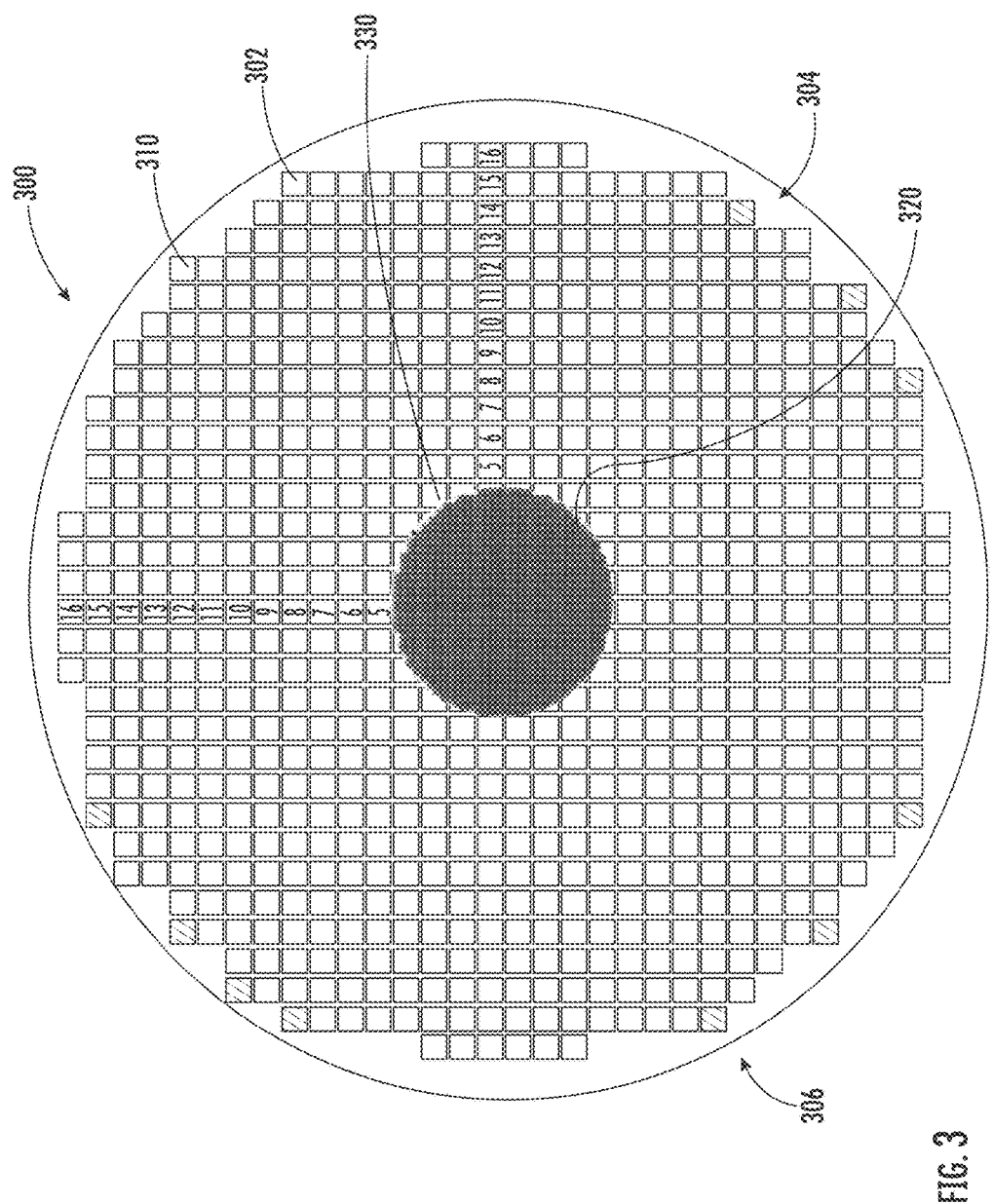
FIG. 3 illustrates a face view of a single dual frequency two-dimensional thirty-two by thirty-two element planar array transducer in accordance with the principles of the present invention.

Referring now to FIG. 3, a face view of a single planar array transducer 300 which is capable of simultaneously or sequentially forming multiple acoustic beams in two axes and at two or more widely separated acoustic frequencies from a single flat 2D planar array transducer is illustrated. The transducer planar array consists of two electrically and acoustically independent 2D planar transducers 310, 320 which are physically integrated into a single multi-frequency configuration. Individual array elements 302 within both the acoustically independent 2D planar transducers are electrically interconnected along front-side columns 304 and back-side rows 306. In the illustrated embodiment, the array face is circular; however other symmetrical geometries (e.g. ellipses or polygons) are also suitable for many acoustic beam sonar applications. Each of the array elements are composed of symmetrical faces (squares as illustrated in FIG. 3) with a face width equal to approximately half the acoustic wavelength in water of the desired nominal frequency.

The larger array 310, hereinafter referred to as the first array, consists of a plurality of transducer elements 302 separated by half a wavelength increments and arranged in a planar array of N (e.g., thirty-two (32)) substantially parallel rows and M (e.g., thirty-two (32)) substantially parallel columns. Each row of transducer elements is electrically connected along a first face of the array while each column of transducer elements is electrically connected along a second face. Each of the transducer elements is further sized so as to be essentially identical. Beamformers are also employed and are connected to the lines on each face to form a first and second plane, respectively, of acoustic beams projected outside of the array plane.

The second smaller array 320 has, in the illustrated embodiment, the same configuration as the first larger array 310, albeit sized smaller. The smaller size of the second array is specifically configured so as to operate at a relatively higher frequency of operation than the larger sized array, i.e. the transducer element width is configured so as to be approximately a fourth the acoustic wavelength in water for the desired higher frequency operation. While using even multiples of a desired acoustic frequency is not necessary, using an even factor (e.g. a factor of four) is sometimes convenient so that the same number of elements (e.g. 32×32) can be used on both the first and second arrays thereby providing the same acoustic beamwidth for each array. Furthermore, the transducer elements generally should be evenly spaced at fractional wavelengths so as to avoid grating lobes which can degrade the performance of the transducer array. The size of the second smaller array is determined based on the desired frequency disparity between the first and second arrays. For example, in a dual frequency application where it is desired that the two (2) frequencies be separated by a factor of four (4), and for equal values of N and M, the higher frequency array will have a respective cumulative diameter four (4) times less than the larger array. Accordingly, the smaller transducer array will occupy an area that is sixteen (16) times less than the first larger array due to the square relationship between the transducer array diameter and its associated area.

In one embodiment, and as illustrated in FIG. 3, a small section 330 in the center of the first array does not contain transducer elements of the first array 310 thereby enabling the 2D array transducer array to physically integrate the second smaller transducer array in this unoccupied center portion. This central area 330 configured for the second transducer array 320 is, in the illustrated embodiment, a factor of sixteen (16) less than the area required for the first array 310. In other words, the area necessary to integrate the second array is in the illustrated embodiment eight (8) transducer elements wide and eight (8) transducer elements long when measured using the transducer elements of the first array. Accordingly, even though elements from the first array have to be removed in order to accommodate the second array, the first larger array still effectively has ninety-three percent (93%) of the elements that it would otherwise possess as compared with a fully filled first array. This allows the larger transducer array in FIG. 3 to achieve a beamwidth of ninety-three percent (93%) of that of a fully filled array. For many applications, this small decrease in beamwidth has a negligible effect on the overall system performance of the transducer array.

As discussed previously, the second 2D transducer array 320 is positioned within this center section in the illustrated embodiment of FIG. 3. Similar to the first 2D transducer array, the second 2D transducer array consists of an array of transducer elements that are, in the illustrated embodiment, spaced at one half wavelength increments measured center to center. Although other frequencies could be readily implemented, the wavelength of the illustrated second array is a factor of four (4) less than the first frequency array. Accordingly, for a given array size (e.g., N=32 and M=32) for both the low and high frequency arrays, the cumulative diameter of the second (higher frequency) array will be a factor of four (4) less than the diameter of the low frequency array. As discussed previously, the second array only occupies a small fraction of the low frequency array surface area thereby permitting the low frequency array acoustic performance to be approximately equivalent to a fully filled two dimensional array. For a multi-frequency transducer array where the frequency difference is a factor of four (4), the center area required for the second high frequency array is less than seven percent (7%) of the total low frequency array size. As shown in FIG. 3, the second high frequency array is fully filled with array elements. However, it is appreciated that similar to the first low frequency array; the second array may also have a non-filled section (e.g. in the center) which is reserved for an additional (i.e. third) transducer array. For instance, and by way of a non-limiting example, a third array of transducer elements that are a factor of four (4) smaller than the second array could be integrated into the center portion of the second array. Additional layers or levels of transducer arrays (e.g. four (4) or more) could also be integrated into the single 2D transducer array form factor. By integrating multiple transducer arrays in this manner, a small higher frequency array may be physically embedded into the aperture of the lower frequency transducer without significantly degrading the performance of either sonar as compared with instances in which they are physical separated.

The dual frequency 2D planar array 300 is electrically coupled to beamforming circuitry to form the multiple beams from the different combinations of transducer elements (not shown) that is electrically connected to the transducer elements in each of the rows (N) and columns (M) of both the first lower frequency array and second higher frequency array, These beamforming circuits provide time and/or phase delays to the signals associated with each column and row, respectively. By providing time and/or phase delays to the signals associated with each column and row, a first and second plane of acoustic beams are formed that are projected outside of the array plane and are furthermore substantially normal to the first and second transducer array. Thus, the total physically integrated dual frequency array 300 provides multiple acoustic beams formed in two axes at two differing frequencies. The use of beamforming circuits and other circuitry useful in the application of the 2D transducer array described herein is described in, for example, U.S. Pat. No. 5,808,967 issued on Sep. 15, 1998 and entitled "Two-dimensional array transducer and beamformer", the contents of which are incorporated herein by reference in their entirety.

Figure 4:
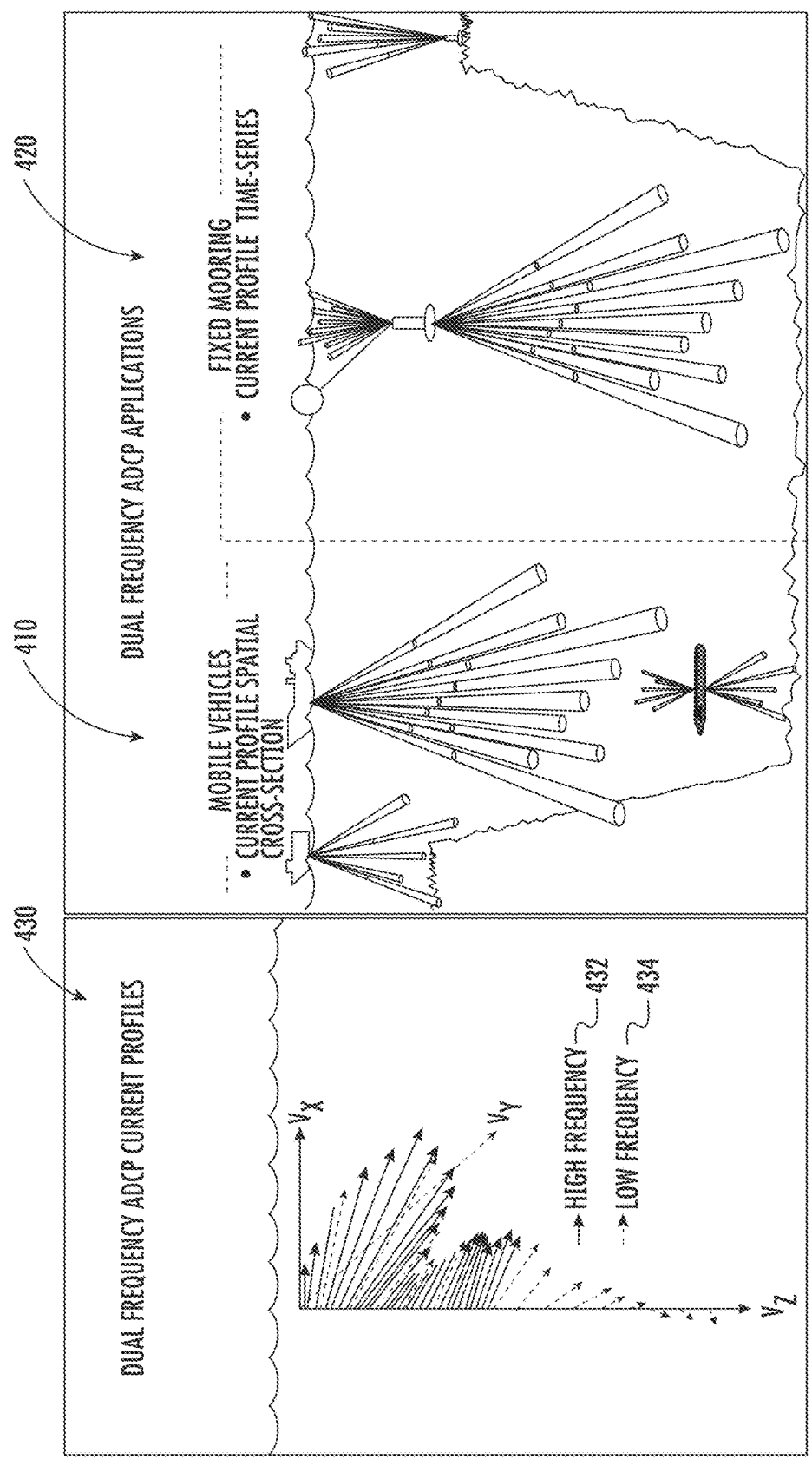
FIG. 4 illustrates various applications and a current profile for dual frequency Acoustic Doppler Current Profiler (ADCP) applications in accordance with the principles of the present invention.

Referring now to FIG. 4, various dual frequency ADCP applications are shown. Specifically, FIG. 4 illustrates the operation of the dual frequency planar array transducer in a current profiling application where the dual frequency planar array transducer can operate from either a mobile surface vessel 410 or alternatively from a fixed (e.g. moored) location 420. The mobile surface vessels with the dual frequency planar array transducer can generate current profiles 430 as a function of depth. Current profiles with high temporal, spatial and velocity resolution utilize the embedded high frequency 2D transducer array to measure near the surface (where there are more spatially and velocity dynamic currents), while current profiles deeper in the water column (where there are less spatially and velocity dynamic currents) are measured using the low frequency 2D transducer array. Accordingly, this single multi-frequency ADCP achieves essentially identical performance of multiple discrete single frequency ADCPs, while simplifying installation as the dual frequency ADCP can be installed in a single location on, for example, a ship's hull.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A multi-frequency transducer array, comprising:
   a single flat planar surface, comprising:
      a first transducer array comprising a first plurality of transducer elements configured for a first nominal frequency; and
      a second transducer array comprising a second plurality of transducer elements configured for a second nominal frequency;
   wherein the first transducer array comprises a central portion that does not contain any of said first plurality of transducer elements.

2. The multi-frequency transducer array of claim 1, wherein the second transducer array is positioned within the central portion.

3. The multi-frequency transducer array of claim 1, where the first transducer array occupies a first symmetrical area portion of the single flat planar surface while the second transducer array occupies a second symmetrical area portion of the single flat planar surface.

4. The multi-frequency transducer array of claim 3, wherein the second symmetrical area portion is disposed entirely within the first symmetrical area portion.

5. The multi-frequency transducer array of claim 4, wherein the second symmetrical area portion is substantially concentric with the first symmetrical area portion.

6. The multi-frequency transducer array of claim 3, wherein the second symmetrical area portion occupies less than ten percent of the first symmetrical area portion.

7. The multi-frequency transducer array of claim 1, wherein the first plurality of transducer elements comprise an array having a row of a value M transducer elements and a column of a value N transducer elements.

8. The multi-frequency transducer array of claim 7, wherein the second plurality of transducer elements comprise an array having a row of a value X transducer elements and a column of a value Y transducer elements.

9. The multi-frequency transducer array of claim 8, wherein the value M is equal to the value X and the value N is equal to the value Y.

10. The multi-frequency transducer array of claim 9, wherein the value M is equal to the value N.

11. A multi-frequency transducer array for use in an acoustic Doppler current profiler (ADCP) application, comprising:
    a single flat two-dimensional planar transducer array structure comprised of a plurality of individual array elements, each of the individual array elements either being electrically interconnected with at least a portion of other ones of the individual array elements along a plurality of planar front-side columns or a plurality of planar back-side rows, the single transducer array structure comprising:
       a first transducer array optimized for operation at a first depth and having a first portion of array elements of the plurality of individual array elements, the first portion of array elements having a first size; and a second transducer array optimized for operation at a second depth and having a second portion of array elements of the plurality of individual array elements, the second portion of array elements having a second size that differs from the first size, said second depth being different than said first depth;

wherein the first transducer array comprises a fully filled array structure while the second transducer array comprises a partially filled array structure having an unoccupied center portion, the first transducer array being disposed within the unoccupied center portion.

12. The multi-frequency transducer array for use in an ADCP application of claim 11, wherein the first depth is expected to have a more spatially and velocity dynamic current than said second depth.

13. The multi-frequency transducer array for use in an ADCP application of claim 12, wherein the first and second transducer array optimization comprises the configuration of an operating frequency for the first and second transducer arrays, respectively.

14. The multi-frequency transducer array for use in an ADCP application of claim 11, wherein the partially filled array structure effectively has ninety-three percent (93%) of the plurality of individual array elements as compared with a fully filled array structure.

15. The multi-frequency transducer array for use in an ADCP application of claim 14, wherein an operational wavelength for the first transducer array is a factor of four (4) less than an operational wavelength for the second transducer array.

16. The multi-frequency transducer array for use in an ADCP application of claim 11, wherein the first transducer array is configured to operate at a first nominal operating frequency and the second transducer array is configured to operate at a second nominal operating frequency, the second nominal operating frequency being different than the first nominal operating frequency.

17. The multi-frequency transducer array for use in an ADCP application of claim 16 where the difference between the first and second nominal operating frequencies is greater than or equal to a factor of four.

18. A transducer array, comprising:
a singular planar structure comprising at least two electrically and acoustically independent two dimensional planar transducers, the at least two electrically and acoustically independent two dimensional planar transducers being distinctly resident on the singular planar structure;
wherein at least one of the at least two electrically and acoustically independent two dimensional planar transducers is resident within another one of the at least two electrically and acoustically independent two dimensional planar transducer.

19. The transducer array of claim 18, wherein the singular planar structure is configured to simultaneously or sequentially form multiple acoustic beams at two or more separated acoustic frequencies.

20. The transducer array of claim 19, wherein the singular planar structure is further configured to simultaneously or sequentially form multiple acoustic beams along two axes.

* * * * *